Figure 1:
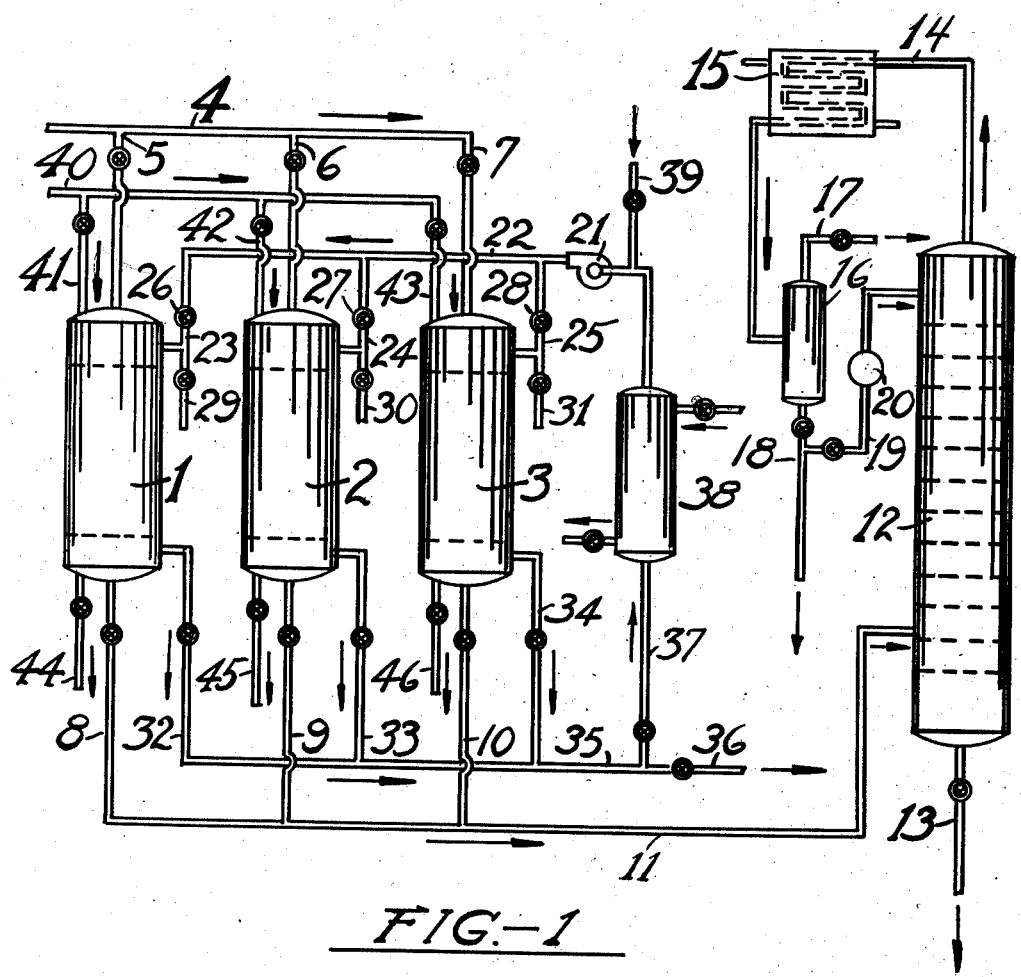

June 17, 1941.  R. W. KREBS  2,246,367

METHOD OF REGENERATING CONTACT MASSES

Filed July 25, 1939  2 Sheets-Sheet 1

Robert W. Krebs Inventor
By P. L. Young Attorney

June 17, 1941.  R. W. KREBS  2,246,367
METHOD OF REGENERATING CONTACT MASSES
Filed July 25, 1939   2 Sheets-Sheet 2

A. CRACK-REGEN. TIME SCHEDULE

B. REGENERATION GAS SCHEDULE

Robert W. Krebs Inventor
By  Young  Attorney

Patented June 17, 1941

2,246,367

UNITED STATES PATENT OFFICE 2,246,367

METHOD OF REGENERATING CONTACT MASSES

Robert W. Krebs, Baton Rouge, La., assignor to Standard Oil Development Company, a corporation of Delaware Application July 25, 1939, Serial No. 286,420

4 Claims. (Cl. 196—52)

This invention relates to a method of regenerating contact masses and it pertains more particularly to a method of removing carbonaceous deposits formed during the treatment of organic compounds such as hydrocarbon oils.

While the invention in its broader phases has a more general application, as will be apparent from the detailed description, it has a particular application to the regeneration of solid catalyst and other contact masses employed in the conversion of hydrocarbon oils at elevated temperatures such as in the cracking, reforming, purifying and refining of such oils.

During the treatment of hydrocarbon oils with a solid contact mass, such as a catalyst, the mass more or less gradually becomes contaminated with carbonaceous deposits. The carbonaceous deposits so formed interfere with the effectiveness of the mass for bringing about the desired treatment. As a result it becomes necessary to periodically regenerate the contact mass to restore its activity. This regeneration can be accomplished by burning the carbonaceous deposits by means of an oxidizing gas heated to the ignition temperature of the carbonaceous deposit.

According to one of the common methods of procedure the regeneration of the mass is accomplished in the same chamber in which the treatment is carried out. This requires periodic interruption of the treating process. In order to permit the process to be operated continuously it has been proposed to provide a bank of reaction chambers interconnected in parallel so that the treating process could be transferred from one reaction chamber to another without interruption when it becomes necessary to regenerate the contact mass in the individual chambers.

In such a mode of operation it is desirable to reduce the length of the regenerating cycle to the shortest possible time in order to increase the capacity of the apparatus.

The regeneration of the contact mass by oxidation results in the evolution of considerable heat. In many cases it is necessary to maintain a close control over the temperature during regeneration in order to avoid deactivation of the contact mass. For example, the activity of clay catalysts, for the cracking, purifying or refining of hydrocarbon oil may be seriously impaired if the temperature during regeneration is allowed to exceed 1200° F.

It has heretofore been proposed to control the temperature during regeneration by introducing a diluent gas into the stream of regenerating gases. For example, it has been proposed to introduce steam or spent combustion gases into the stream and to pass the resulting mixture through the contact mass to be regenerated. When operating in this manner, the diluent gases can be employed to remove heat liberated during the regenerating process and to control the rate of combustion.

In order to effect rapid regeneration of the contact mass it is desirable to pass large quantities of regeneration gas through the contact mass per unit time.

Also to reduce original investment and operating costs for a given capacity, it is desirable to operate all parts of the equipment at maximum capacity.

One of the objects of the present invention is to provide a method of regenerating such contact masses which will permit operating the regenerating equipment at maximum capacity at all times.

A further object of this invention is to provide a method of regeneration which will permit regeneration in a shorter time.

Other more specific objects of the invention will be apparent from the detailed description hereinafter.

For illustrative purposes, I have chosen as a specific embodiment the regeneration of contact masses employed in the catalytic cracking of hydrocarbon oil. It will be understood, however, that the invention in its broader phases is not so restricted. When carrying out catalytic cracking operations employing a bank of reaction chambers wherein the catalyst in the individual reaction chambers is subjected to alternate cracking and regenerating cycles, it is usually necessary to remove residual oil vapors following the cracking cycle before starting the regenerating cycle and to remove the residual products of regeneration following the regenerating cycle before repeating the cracking cycle. The removal of these residual products can be accomplished either by stripping the catalyst bed with an inert diluent gas such as steam, nitrogen, carbon dioxide, etc., or by evacuating the catalyst mass of the residual products.

When operating in such manner the catalyst mass in the individual reaction chambers therefore undergoes the following cycles in sequence:

1. The cracking cycle
2. The purging cycle
3. The regenerating cycle
4. The purging cycle following regeneration.

As previously mentioned, during the regenerating cycle it is desirable to pass the regenerating gases through the contact mass as fast as possible. I have found that when attempts are made to pass the regenerating gas through the contact mass at uniformly high velocities throughout the regenerating cycle the resulting contact mass is not fully and completely regenerated throughout. For example at extremely high velocities, at normal operating temperatures, the catalyst at the inlet side of the reaction chamber is not fully regenerated. This can be overcome by reducing the velocity of the regenerating gases, but in such case the length of the time required for regeneration is correspondingly increased.

In accordance with one phase of the present invention, I pass the regenerating gases through the contact mass at a relatively low velocity at the beginning of the regenerating cycle until combustion has been started. Thereafter the velocity is rapidly increased to the capacity of the blower. During the final stages of regeneration the velocity of the regenerating gases is again reduced.

According to another interrelated phase of the invention I vary the velocity of regenerating gases passing through the contact mass during the individual regenerating cycles while operating the circulating blower at optimum capacity by interconnecting the blower with a plurality of regenerating chambers in such manner that when the volume and velocity of regenerating gases is being reduced in one reaction chamber it is being simultaneously increased in another. As a result the circulating blower can be operated at full capacity at all times.

Figure 2:
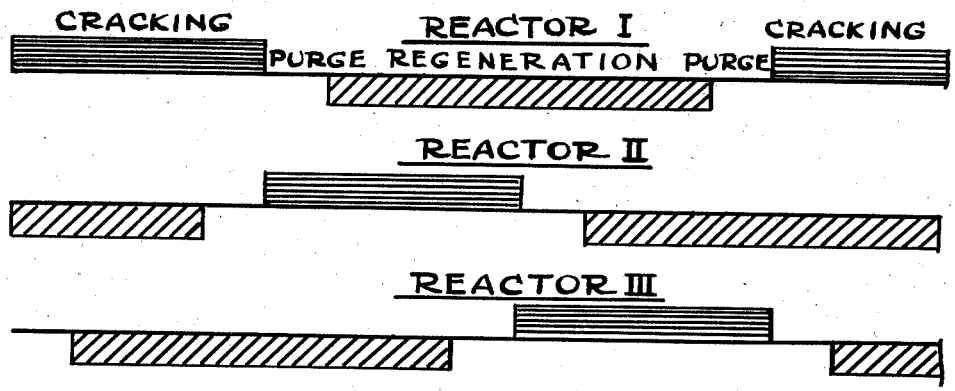
Figure 2:
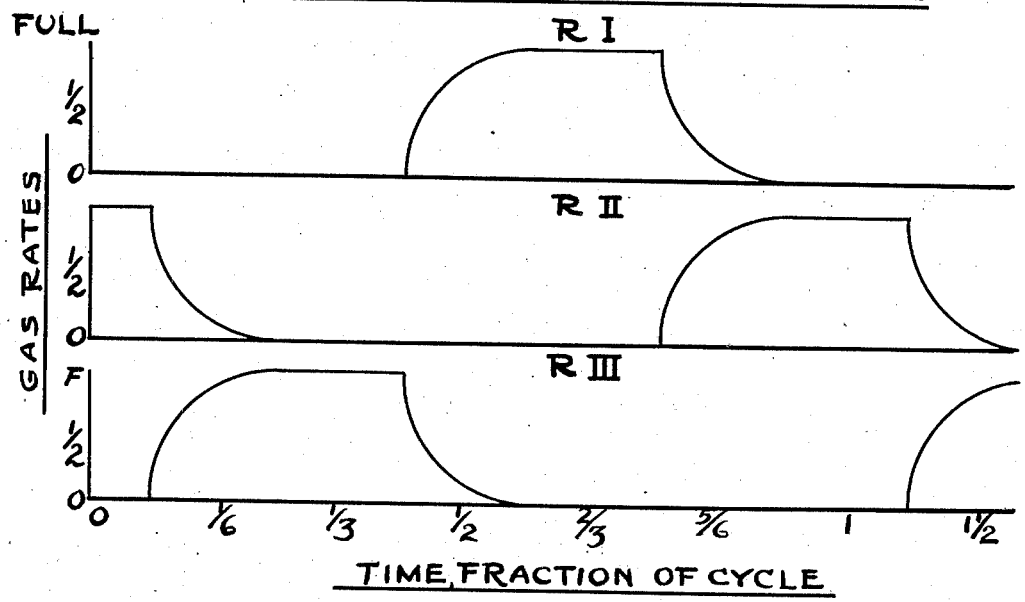

Having described the general nature and objects of the invention I will now proceed with a more detailed description in which reference will be made to the accompanying drawing. In the drawings Figure 1 is a diagrammatical illustration of an apparatus suitable for carrying the invention into effect and Figure 2 is a graphic diagram, showing the phase relationship between the reaction chambers during all parts of the cycle.

Referring to the drawings the reference characters 1, 2 and 3 designate three reaction chambers adapted to be used for catalytic treatment of hydrocarbon oils. All of these reaction chambers contain a mass of solid catalyst. Such catalyst may comprise, for example, naturally active or activated clays or synthetic gels comprising silica and alumina.

The oil to be cracked preferably in vapor form and preheated to the desired reaction temperature is introduced into the reaction chambers through a manifold line 4 having branch lines 5, 6 and 7 leading to reaction chambers 1, 2 and 3 respectively. Cracked products after passing through the reaction chambers 1, 2 and 3 are withdrawn therefrom through line 8, 9, 10 respectively which merge with a manifold line 11 which in turn communicates with a fractionating tower 12, or other suitable recovery apparatus for separation of the desired products from insufficiently cracked constituents. Condensate formed in the fractionating tower 12 and comprising insufficiently cracked constituents is withdrawn from the tower through line 13 and may be subjected to further cracking treatment either in the same or different cracking unit.

Vapors remaining uncondensed in the fractionating tower 12 are removed therefrom through line 14 and are passed to a condenser 15 wherein the desired distillate product is condensed. After passing through the condenser 15 the products are passed to a receiver 16 wherein the liquid distillate separates from normally gaseous constituents. Wet gases separated in the receiver 16 are withdrawn through line 17 and may be passed through a suitable adsorption system for the removal of uncondensed gasoline constituents therefrom. Liquid distillate separated in the receiver 16 is withdrawn through line 18 as a final product of the process. This product may be subjected to further stabilization, refining and other finishing treatments as desired. If desired a part of the distillate removed through line 18 may be returned to the top of the fractionating tower 12 through line 19 and pump 20 as a reflux medium therefor.

As illustrated any one of the reaction chambers 1, 2, or 3, may be on the cracking cycle while the other two are on the purging and regenerating cycles. For illustrative purposes it will be assumed that reaction chamber 1 is on the cracking cycle whereas the other two reaction chambers 2 and 3 are on the regenerating and purging cycles. It will be understood that the relative number of chambers on and off the cracking stream need not necessarily be in the ratio of 1 to 2 as just stated but will depend upon the relative times required for cracking, regenerating and purging which in turn will depend upon the nature of the feed stock, the conversion, activity of the catalyst and other factors. For illustrative purposes it also will be assumed that the time ratio between the total purging periods for each complete cycle including the periods before and after the cracking period, the cracking period and regenerating period will be of the order of 1, 2 and 3. In other words the total purging period for each cycle will be ½ the cracking period and ⅓ the regenerating period, whereas the cracking period will be ⅔ the regenerating period. For example, assuming that the length of the cracking period to be 30 minutes, then the length of the regenerating period will be 45 minutes and the length of each purging period will be 7½ minutes or a total of 15 minutes for the two purging periods.

By employing such a time ratio one reaction chamber can be maintained on the cracking stream at all times and the unit can be operated with a constant throughput.

In carrying out the regeneration of the catalyst mass in the individual reaction chambers 1, 2 and 3, the diluent gas is forced by means of blower 21 through line 22 having branch lines 23, 24 and 25 provided with valves 26, 27, and 28 respectively, leading to the reaction chambers 1, 2 and 3 respectively. Air or other oxygen containing gas is led into the branch line 23, 24, and 25 through valve lines 29, 30, and 31 respectively. The oxygen concentration of the regenerating gases passing through the individual reaction chambers may independently be controlled by the valves positioned in the lines 29, 30 and 31.

Products of regeneration after passing through the reaction chambers 1, 2 and 3 are withdrawn through branch lines 32, 33 and 34 leading to a manifold line 35. The spent gases from the reaction chambers may be rejected through line 36. It is preferred however, to recirculate a part of the regeneration products. To this end a part of the products of regeneration may be recycled through line 37. The recycle gases are preferably cooled in any desirable manner such as by heat exchanger 38 before being returned to the reaction chamber. If desired, in lieu of recirculating spent regenerating gases a diluent gas from an extraneous source such as steam, nitrogen or the like may be passed to the suction side of blower 21 through line 39.

For purging the residual products before and after the cracking cycle, steam or other gas may be introduced through line 40 which has branch lines 41, 42 and 43 leading to the reaction chambers 1, 2 and 3 respectively. The products of purging may be withdrawn from reaction chambers, through lines 44, 45, and 46 respectively.

In accordance with the present invention, at the start and finish of the regenerating period I introduce the regenerating gases at a lower velocity than during the main portion of the regenerating period. As the result it is possible to maintain a more uniform temperature control throughout the regeneration and to accomplish a more complete regeneration of the entire catalyst mass.

As a further phase of the invention the flow of regenerating gas to the individual reaction chambers is so controlled that one of the reaction chambers is starting the regenerating period while another is finishing the regenerating period so that the regenerating gas passes through two chambers at the start and finish of the regenerating period and through only one chamber during the main intermediate portion of the regenerating period. As a result the velocity of gases passing through the individual chambers can be reduced without changing the blower speed and while operating the blower at maximum capacity continuously.

This is more clearly illustrated in the flow diagram shown in Figure 2 wherein the total operating cycle starting from the beginning of one cracking period to the beginning of another is shown. At the upper portion A (Figure 2) is shown the relative lengths of periods devoted to the cracking, purging and regenerating. For example, it will be noted that the regenerating period is 1.5 times the length of the cracking period and the total purging period is ½ the cracking period. When employing such a time ratio one reaction chamber may be on the cracking stream at all times, two chambers on the regeneration cycle during the start and finish of the regenerating period and only one during the intermediate period. Referring to the top section A of Figure 2, it will be noted that during the final stage of the regenerating period in reaction chamber 2, regeneration is starting in reaction chamber 3. During this phase the blower 21 is feeding regenerating gas to both of these reaction chambers and as a result the velocity of regenerating gases passing therethrough will be less than that when the total regenerated gases from blower 21 is being passed through a single reaction chamber.

After the regeneration in the reaction chamber 2 has been completed the total volume of regenerating gases from the blower 21 (see Figure 1) will pass through reaction chamber 3. The blower 21 will continue to feed gases to the reaction chamber 3 until the reaction chamber 1 is ready for regeneration. When this point is reached, a part of the regenerating gases will be passed to reaction chamber 1.

I have found that the splitting of the flow of the regenerating gases to two reaction chambers during the first and last part of the regenerating period does not prolong the regenerating cycle but on the contrary expedites regeneration and permits more effective control of temperature. While the exact explanation of this is not fully understood it is believed that ignition of the carbonaceous deposit is more readily started when the regenerating gases is at relatively low velocity. Likewise during the final stages of regeneration factors other than the velocity of the regenerating gas such as rate of diffusion of the regenerating gas into and out of the catalyst determine the rate of regeneration.

It will be understood that the manipulation of valves in the regenerating circuit may be accomplished manually or automatically by suitable synchronizing equipment.

While I have shown the reaction chambers 1, 2 and 3 as containing a single bed of catalyst mass it will be understood that these reaction chambers may be provided with a plurality of spaced beds of catalyst material with suitable distributing conducts for passing the regenerating gases through the individual catalyst beds.

It will be further understood that, while I have shown three reaction chambers, any suitable number can be employed in accordance with the present invention and that the number employed will depend upon the relative amount of time required bringing about the regeneration and purging treatment as compared to the length of the cracking period.

Having described the preferred embodiment of the invention it will be understood that it embraces such other variations and modifications as come within the spirit and scope thereof. It will be further understood that it is not my intention to unnecessarily restrict the invention or dedicate novel phases thereof.

I claim:

1. In the regeneration of contact masses containing carbonaceous deposits wherein the regeneration is accomplished by passing a gas containing controlled amounts of oxygen through a contact mass at a temperature sufficient to burn said carbonaceous deposits and the passage of such gases is continued until regeneration is completed; the improvement which comprises passing the regeneration gas through the contact mass at lower velocity during the initial and final period of the regeneration than during the intermediate period.

2. In a contact treating process wherein a plurality of treating chambers containing solid contact masses are provided, each of which undergoes alternate treating and regenerating periods and wherein a single means is provided for selectively passing the regenerating gas to each of said treating chambers; the improvement which comprises interconnecting said single means with a greater number of treating chambers at the starting and finishing periods of regeneration than during the intermediate period whereby the velocity of regeneration gases passing through the treating chambers at the starting and finishing periods of the regeneration is lower than during the intermediate period.

3. In a solid contact treating process wherein a contact mass is subjected to alternate regeneration and conversion periods and wherein a plurality of treating chambers are provided whereby the process may be operated continuously by transferring the conversion treatment from one chamber to another as regeneration is required; the improvement which comprises providing a constant velocity stream of regenerating gas, passing said stream through a predetermined limited number of reaction chambers during the major portion of the regenerating cycle, passing said stream through a greater number of treating chambers at the starting and finishing periods of regeneration whereby the velocity of the gases passing through the individual treating chambers at the start and finish of the regenerating periods will be lower than during the main portion of the regenerating period.

4. In a process for the catalytic conversion of hydrocarbon oils wherein the catalyst mass is subjected to alternate regeneration and conversion periods in situ and wherein a plurality of conversion chambers are provided whereby the process may be operated continuously by transferring the conversion treatment from one chamber to another as regeneration is required; the improvement which comprises providing a constant velocity stream of regenerating gas, passing said constant velocity stream through a predetermined number of conversion chambers during the major portion of the regenerating period and passing said stream through a larger number of conversion chambers at the start and finish of the regenerating periods whereby the velocity of regenerating gas passing through the individual chambers will be lower at the beginning and end of the regenerating cycle than during the major portion of the regeneration cycle.

ROBERT W. KREBS.